[19] United States Patent
Martin

[11] Patent Number: 4,514,514
[45] Date of Patent: Apr. 30, 1985

[54] PROCESS AND VANADIUM CATALYST FOR OLEFIN POLYMERIZATION

[75] Inventor: Joel L. Martin, Bartlesville, Okla.

[73] Assignee: Phillips Petroleum Company, Bartlesville, Okla.

[21] Appl. No.: 489,445

[22] Filed: Apr. 28, 1983

[51] Int. Cl.[3] .............................................. C08F 4/68
[52] U.S. Cl. ................................. 502/121; 502/128; 526/139; 526/144
[58] Field of Search ................ 502/104, 121, 103, 128

[56] References Cited

U.S. PATENT DOCUMENTS

| | | | |
|---|---|---|---|
| 2,969,345 | 1/1961 | Coover et al. | 502/121 X |
| 3,088,942 | 5/1963 | Coover | 502/121 X |
| 3,186,977 | 6/1965 | Coover et al. | 502/121 X |
| 3,278,643 | 10/1966 | Achon | 502/121 X |
| 3,413,376 | 11/1968 | Cleary | 260/683.15 |
| 3,427,257 | 2/1969 | Bayer et al. | 502/121 X |
| 3,488,334 | 1/1970 | Bayer et al. | 502/121 X |
| 3,595,843 | 7/1971 | Huerta et al. | 502/103 X |
| 3,595,844 | 7/1971 | Huerta et al. | 502/103 X |
| 3,595,890 | 7/1971 | Huerta et al. | 502/103 X |
| 3,700,638 | 10/1972 | Kawasaki et al. | 260/84.1 |
| 3,929,745 | 12/1975 | Huerta et al. | 502/121 X |
| 4,202,958 | 5/1980 | Yamaguchi et al. | 526/142 |
| 4,232,140 | 11/1980 | Ort | 526/129 |
| 4,233,182 | 11/1980 | Hoff et al. | 252/429 C |

Primary Examiner—Patrick Garvin
Attorney, Agent, or Firm—Edward L. Bowman

[57] ABSTRACT

A process for producing a novel highly active vanadium catalyst comprising a particulate solid produced by reacting a vanadium compound, a phosphorus compound, and an organoaluminum compound and its use in the polymerization of olefins.

20 Claims, No Drawings

PROCESS AND VANADIUM CATALYST FOR OLEFIN POLYMERIZATION

BACKGROUND OF THE INVENTION

This invention relates to a process for producing olefin polymers and to a high activity catalyst suitable for use in the process.

It is old in the field of olefin polymerization to prepare solid polyolefins by employing catalyst systems comprising a transition metal compound and an organometallic cocatalyst. Until fairly recently most of such catalyst systems were relatively low in activity and as a result generally required the employment of a catalyst removal step in order to obtain a polymer having satisfactory properties. Recently, however, much research has been directed toward the discovery of catalyst systems that are so active that there is no need to employ the catalyst removal step. Such catalyst systems are obviously of significant commercial importance since they allow for appreciable reductions in the costs of producing such polymers.

Included among the early relatively low activity catalysts were systems involving the use of a vanadium halide, an aluminum halide, and an organophosphorus compound. See for example the catalyst systems disclosed in U.S. Pat. No. 2,969,345 and U.S. Pat. No. 3,186,977. It has been noted that when a vanadium halide, an organoaluminum halide, and an organophosphorus compound are combined in the polymerization diluent as taught by those patents, an intractable oily or gummy form of catalyst is produced. While this might not present too much of a problem if the polymerization were conducted at temperatures under which the polymer is substantially dissolved, for modern particle form polymerization wherein the polymer is produced in solid form, it would lead to serious fouling of the reactor. For a particle form polymerization, it would obviously be more desirable, if not absolutely necessary, to have the catalyst in the form of individual solid particles. It was further noted that the activity of the catalysts of the two aforementioned patents was not nearly high enough to produce polymer in such quantity that subsequent catalyst removal could be eliminated.

The present invention is based upon the discovery of a way to produce a solid vanadium-containing catalyst capable of producing ethylene polymers in such amounts that the catalyst removal step is generally unnecessary.

SUMMARY OF THE INVENTION

In accordance with one aspect of the present invention, a solid particulate vanadium-containing catalyst component is produced by reacting reactants comprising a vanadium halide compound, an organophosphorus compound, and an organoaluminum compound or an organoaluminum compound and a vanadium organophosphate under such conditions that a particulate solid is obtained.

Another aspect of the invention is the vanadium-containing catalyst component resulting from such processes.

Still another aspect of the invention is a catalyst system comprising the vanadium-containing catalyst component and a cocatalyst comprising an organoaluminum compound.

In an especially preferred embodiment of the present invention, the cocatalyst includes an activating amount of a halocarbon activator.

Still another aspect of the present invention is the use of the solid particulate vanadium-containing catalyst in the polymerization of ethylene.

Yet another aspect is the polymer produced using such catalyst.

DETAILED DESCRIPTION OF THE INVENTION

The vanadium compound used in making the particulate catalyst component is selected from those vanadium compounds having a V—X linkage wherein X is a halogen. Typical examples of such compounds are the halides, oxyhalides, alkylhalides, and alkoxyhalides. Especially notable halo-vanadium compounds are those compounds of the formula $VX_{4-n}Y_n$ wherein X is a halogen atom, Y is an alkoxy group with 1 to 12, preferably 1 to 6 carbon atoms or trialkylsiloxy group ($-OSiR^3_3$ group where $R^3$ is an alkyl group with 1 to 12 carbon atoms), and n is a number defined by: $0 \leq n < 4$), and the compounds of the formula: $VOX_{3-m}Y_m$ (wherein X is a halogen atom, Y is an alkoxy group with 1 to 12, preferably 1 to 6 carbon atoms or trialkylsiloxy group ($-OSiR^3_3$ group wherein $R^3$ is an alkyl group with 1 to 12 carbon atoms), and m is a number defined by: $0 \leq n < 3$). More specific examples of compounds having such a V—X linkage are vanadium tetrachloride, vanadium tetrabromide, vanadium tetraiodide, mono-n-butoxy-vanadium trichloride, vanadyl trichloride, vanadyl tribromide, di-n-butoxy-chlorovanadyl, diisopropoxymonochlorovanadyl, mono-n-butoxydichlorovanadyl, monoisopropoxydichlorovanadyl, and monotrimethylsiloxydichlorovanadyl. The currently preferred vanadium compounds are vanadium tetrachloride and vanadyl trichloride, which is also sometimes referred to hereafter as vanadium oxychloride or as $VOCl_3$.

The organoaluminum compound used in preparing the novel particulate catalyst is selected from those having the formula $AlR'_n X_{3-n}$ wherein X is halogen, each R' is individually selected from the group consisting of alkyl radicals, aryl radicals, cycloalkyl radicals, and alkoxy radicals, and n is a number from 1 to 3. Representative types of compounds having such formulas include dialkylaluminum monohalides, alkylaluminum dihalides, trialkyl aluminums, alkyl, cycloalkyl, or arylaluminum sesquihalides, and dialkylaluminum alkyloxides. Particularly preferred organoaluminum compounds are diethylaluminum chloride, ethylaluminum dichloride ethylaluminum sesquichloride, and diethylaluminum ethoxide. The best organoaluminum compound to use varies somewhat depending upon the particular organophosphorus compound being used.

The organophosphorus compound used in preparing the novel particulate catalyst is selected from those having a P—L linkage wherein L is selected from the group consisting of alkyl radicals, alkoxy radicals, aryl radicals, aryloxy radicals, cycloalkyl radicals, cycloalkyloxy radicals, cycloalkylaryl radicals, alkylamino radicals, and haloalkloxy radicals. Typical examples of such compounds include tris-N,N-dialkyl phosphoramides, dialkyl phosphites, trialkyl phosphites; trialkyl phosphates, trialkyl phosphines, triaryl phosphines, triaryl phosphine oxides, triaryl phosphites, and haloalkyl phosphites. Generally, the radicals of the L group will have only 1 to 10 carbon atoms.

In an alternative embodiment of the present invention instead of reacting the organoaluminum compound, and the vanadium and organophosphorus compound, one can merely react the organoaluminum compound and a vanadium organophosphate containing functionality of the formula

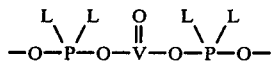

wherein each L is individually selected from the group of L's described above. The preparation of such compounds disclosed in U.S. Pat. No. 3,595,890. For best results a vanadium organophosphate must be selected that is soluble in the reaction liquid. A particularly preferred type of vanadium organophosphate are the vanadium oxy bis(dialkyl phosphates).

The catalyst preparation can be carried out in any liquid which allows the recovery of a solid particulate material. The liquids suitable will vary somewhat depending upon the particular combination of reactants selected. It is currently preferred to conduct the reaction in the presence of a liquid consisting essentially of nonaromatic halocarbon. Examples of halocarbons which have been found suitable are 1,1,2-trichlorotrifluoroethane, dichloromethane, 1-chlorobutane, dibromomethane, and tetrachloroethylene. The currently most favored liquid is dichloromethane. The amount of liquid employed can vary widely, however, if some of the reactants are added in a liquid which is not suitable for the formation of the particulate product, the quantity of such liquid should preferably be less than that of the liquid in which the particulate product can be obtained.

In the embodiment of the invention involving three reactants, the reactants can be combined in any order. It has, however, been noted that the most active catalysts have been obtained from those reactions in which the vanadium compound is first reacted with the organophosphorus compound and then the resulting product is reacted with the organoaluminum compound.

The reaction of the reactants can be carried out under any suitable conditions. Generally, the reaction will be conducted at a temperature in the range of about 0° C. to about 100° C. and a pressure in the range of about 10 to about 100 psia. Preferably, the reaction is conducted without the addition of heat and when the addition of a reactant produces an exothermic reaction, the reactant addition is preferably spread out over a period of time such that large temperature increases are avoided.

The particulate solid can be recovered from the reaction mixture by any suitable means. Most typically the solid is separated from the liquid by filtration. In one particularly preferred embodiment, the solid is washed with a hydrocarbon liquid until the solid is substantially free of compounds soluble in said hydrocarbon liquid. Typical suitable wash liquid include liquids of the type generally used as liquid diluent in the polymerization of ethylene. Examples of such liquids include heptane, hexane, pentane, benzene, toluene and the like.

The reactants can be combined in any amounts that will allow the production of recoverable particulate solid. Generally, the P/V atom ratio of the reactants is in the range of about 0.2/1 to about 4/1, more preferably in the range of about 0.3/1 to 3/1. Generally, the Al/P atom ratio of the reactants is in the range of about 0.5/1 to about 2/1, more preferably about 1/1.

The solid particulate catalyst of this invention is useful in the polymerization of olefins. It provides particularly surprising results in the production of homopolymers of ethylene and copolymers containing at least 90 mole percent and preferably 95 mole percent ethylene.

Examples of typical olefin monomers include alpha-olefins containing 2 to 20 carbon atoms per molecule, the most preferred being usually those with 2 to 6 carbon atoms per molecule, such as ethylene, propylene, butene-1, 4-methylpentene-1, and hexene-1. Such monoolefins can also be copolymerized with each other and with diolefins, preferably diolefins containing 4 to 20 carbon atoms. Examples of such diolefins include 1,3-butadiene, 1,5-hexadiene, 4-vinylcyclohexene, 1,3-divinylcyclohexane, cyclopentadiene, and the like.

The polymerization may be carried out in any suitable manner. Typically, the polymerization is carried out in a liquid diluent. Typical diluents include hydrocarbons, such as for example, alkanes or cycloalkanes, such as n-butane, n-hexane, n-pentane, n-heptane, cyclohexane, isobutane, methylcyclohexane, or mixtures thereof.

The polymerization pressure is generally in the range of about 15 psia (0.103 MPa) to about 1000 psia (6.89 MPa), more preferably no higher than about 700 psia (4.83 MPa). The temperature is generally selected between 20° C. and 200° C., more preferably between 60° C. and 120° C. The catalyst is suitable for continuous or batch polymerization.

The catalyst is used with a cocatalyst comprising an organometallic reducing agent. Typical examples of such reducing agents are the organometallic compounds of the metals of Groups Ia, IIa, IIb, IIIa, and IVb of the Periodic Table, such as organic compounds of lithium, magnesium, zinc, aluminum and tin. More specific examples of such compounds include the completely alkylated compounds whose alkyl radicals contain 1 to 20 carbon atoms, either straight or branched, such as for example, n-butyl lithium, diethylmagnesium, diethylzinc, trimethylaluminum, triethylaluminum, triisobutylaluminum, tri-n-butylaluminum, tri-n-decylaluminum, tetraethyl tin and tetrabutyl tin. Also included are the alkyl metal hydrides, for example, those containing alkyl radicals having 1 to 20 carbon atoms, such as di-isobutylaluminum hydride and trimethyl tin hydride. Also suitable are the alkyl halides in which the alkyl radicals contain 1 to 20 carbon atoms such as ethylaluminum sesquichloride, diethylaluminum chloride, and diisobutylaluminum chloride.

An especially preferred embodiment of the invention employs an organoaluminum cocatalyst and a halocarbon activator, selected from halogen-substituted alkanes having 1 to 10 carbon atoms, more preferably 1 to 5 carbon atoms per molecule. The especially preferred activators are chlorine-substituted alkanes having no more than two chlorines on any primary carbon, no more than one chlorine on any secondary carbon atom, and no chlorine on any tertiary carbon atom. Examples of typical activators include dichloromethane, bromochloromethane, 2-bromopropane, 1,2-dibromoethane, dibromomethane, fluorotrichloromethane, 1,1,2-trichloro-1,2,2-trifluoroethane, 1,1,1-trichloroethane, 1,2-dichloroethane, 1,2,2-trichloroethane, 1-fluoro-1,1-dichloro-2,2,2-trichloroethane, 1,2-difluoro-1,2-dichloroethane, 1,2-dichlorotetrafluoroethane, difluorodichloromethane, 1,2-difluorotetrachloroethane and 1-chlorobutane. The currently preferred activators are dichloromethane and because of its effectiveness, low toxicity, and moderate boiling point, 1,2-difluorotetrachloroethane.

In the practice of this invention, the particulate solid catalyst is effective when used in amounts conventionally used in such reactions, i.e., about 0.03 to 2 g per liter of diluent. However, it is not necessary to use such large amounts of the catalyst and such would in face defeat one of the advantages of the catalyst which is the production of such large levels of polymer per unit of catalyst that one can dispense with removal of catalyst from the polymer. It is, therefore, preferred to use an amount of catalyst which provides about 0.0001 to 0.05 g of vanadium-containing solid catalyst per liter of diluent, more preferably about 0.001 to 0.01 g per liter of diluent.

The amount of cocatalyst employed can vary over a wide range depending upon the particular cocatalyst selected and the results desired. With the preferred organoaluminum cocatalysts enough is used to provide at least 0.3 mole of the cocatalyst per gram atom of vanadium in the particulate solid catalyst employed. More generally the ratio of Al in the cocatalyst to vanadium in the catalyst is in the range of about 0.3/1 to 1000/1, more preferably about 1/1 to 500/1.

The ratio of the activator to the cocatalyst can also vary over a wide range. If desired the activator can be used in excess of that needed for maximum activation. Typical ratios for the moles of activator to mg atoms of Al would be about 0.5/1 to about 160/1, more preferably in the range of about 3/1 to about 100/1. When triethylaluminum is the cocatalyst particularly good results are obtained when the ratio is about 20/1.

The order of addition of the polymerization reaction components is not considered to be particularly critical. Typically in a batch process cocatalyst is added, then activator, then catalyst, then hydrogen, then hydrocarbon diluent, and then monomer. In view of the fact that many halocarbons which permit the formation of the particulate solid are also activators, it is possible to prepare the particulate solid directly in the reaction vessel eliminating the need for recovering the catalyst. For example, a vanadium compound such as $VCl_4$ and a phosphorus compound such as triethylphosphite can be added to $CH_2Cl_2$ in the polymerization vessel to form a solution and then an organoaluminum compound can be added to cause formation of the particulate solid. Subsequently, hydrocarbon diluent and cocatalyst can be added to the polymerization vessel.

The mean molecular weight based on the melt index of the polymers produced using the inventive catalyst can be regulated by the employment of molecular weight modifier, such as for example hydrogen. The high hydrogen response of the vanadium-containing catalyst leads to very low molecular weight polyethylenes when the ethylene pressure is reduced by hydrogen. Thus, if an attempt is being made to produce high molecular weight polyethylenes hydrogen control would have to be closely monitored.

It has also been noted that by varying the P/V ratio in the catalyst, it is possible to control to some extent the molecular weight distribution of polyethylene.

The density of polymers obtained from ethylene can be varied by copolymerization with butene-1 or other 1-olefin as known in the art.

The inventive catalysts have provided ethylene polymers having densities varying from 0.968 to 0.901 g/cc, melt indexes varying from 0.1 HLMI to over 600 MI, and Mw/Mn varying from 6.4 to 21. The polymers have many physical characteristics in common with polymers obtained using the more conventional chromium on silica catalysts. In addition, the inventive polymerization catalysts allow one to obtain substantially saturated ethylene polymers like those generally produced using titanium catalysts. For example, with the inventive vanadium catalyst, it is possible to obtain ethylene polymers wherein the number of vinyl groups per 1000 carbon atoms as determined by infrared analysis is less than about 0.1. In view of the fact that such polymers are substantially free of vinyl unsaturation they are particularly suitable for applications requiring superior environmental stress crack resistance.

The polyolefins obtained by the process of this invention may be used according to all who know fabricating techniques such as extrusion, injection, blow extrusion or rolling.

A further understanding of the present invention and its advantages will be provided by the following examples resulting from the applicant's research.

In the following examples unless indicated otherwise the following procedures were used:

All phosphorus compounds as purchased were dried over Davison H-151 alumina. The dichloromethane used was Fisher certified and stored over Davison H-151 alumina. The aluminum alkyls were used as the hydrocarbon solutions as received from Texas Alkyls. The vanadium oxytrichloride and vanadium tetrachloride was used as received from Stauffer Chemical Company.

All ethylene polymerizations were carried out in a one gallon packed, Autoclave Engineers, stirred reactor. The autoclave was partly filled with heptane and heated to above 150° C. Hot heptane was flushed out through a bottom valve and then the reactor was flushed with ethylene and then three times with isobutane. Cooling water was run through the reactor jacket to bring the temperature below 40° C. before charging the reactants. The order of charging was cocatalyst, chlorocarbon activator, catalyst, hydrogen and isobutane. The volume of isobutane was always 2 L while hydrogen was charged as the pressure drop from either a 2.4 L or a 0.325 L vessel. The reactor was then raised to the polymerization temperature and ethylene was added so as to raise the reactor pressure by 230 psi. Ethylene pressure was maintained at this value for 1 hour and then volatiles were vented from the reactor to terminate the run. Productivities of (g/g) refer to grams of polymer obtained per gram of catalyst per hour of polymerization.

Polymer evaluations reported in the following examples used the following procedures:

MI (Melt index, g/10 min 190° C.), ASTM D 1238, Condition E.

HLMI (High load melt index, g/10 min, 190° C.) ASTM D 1238, Condition F.

HLMI/MI=Shear response where larger value indicates a broader molecular weight distribution.

Mw (Weight average molecular weight), Determined by size exclusion chromatography.

Mn (Number average molecular weight), Determined by size exclusion chromatography.

HI (Heterogeneity Index=Mw/Mn), The higher the number the broader the molecular weight distribution.

Flexural modulus, MPa (psi), ASTM D 790.

ESCR (Environmental Stress Cracking Resistance), $F_{50}$ in hours, ASTM D 1693, Condition A.

RDI (Rheological Distribution Index), Another way of evaluating the molecular weight distribution involving subjecting a molten polymer sample to a sinusoidal oscillating shear strain between two parallel circular plates at 190° C. The frequency of oscillation is varied from 0.1 to 500 radians per second. A log-log plot of frequency vs. dynamic loss modulus is made and the slope of the curve determined when the loss modulus is equal to 100,000 ($10^5$) dynes/cm$^2$. RDI equals the reciprocal of that slope.

Density, g/cc, ASTM D 1505.

EXAMPLE I

When ethylaluminum dichloride (EADC) is added to a mixture of tri-n-butylphosphate and VCl$_4$ in heptane as taught in prior art patents such as U.S. Pat. No. 2,969,345, an oily mass was produced. No particulate solid was recovered. Such catalyst systems when used to polymerize ethylene produce only relatively small amounts of polyethylene.

EXAMPLE II

A 4 mL CH$_2$Cl$_2$ solution of 16.6 mmoles VCl$_4$ was added to 20 mL of CH$_2$Cl$_2$. Then 4.5 mL of tri-n-butylphosphate (16.6 mmoles) was added to give a dark red solution. The solution was heated for 3 hours at 100° C. then filtered in a glove box. No solid was obtained. Over a 15 minute period, 11 mL of 25 weight percent heptane solution of ethylaluminum dichloride (16.6 mmoles) was added to the red solution. The resulting slurry was stirred for 6 hours and then filtered. A violet solid was recovered and washed with about 20 mL of hexane and dried. The weight of solid recovered was 5.91 g. The solid thus theoretically contained 14.3 weight percent vanadium based upon the assumption of a complete precipitation of all the vanadium.

The activity of the solid as a catalyst component for ethylene polymerization was then determined by using the respective solid catalyst, 0.5 mmole (0.5 mL) of triethylaluminum as a 1M solution in n-heptane and 3 mL of dichloromethane. The hydrogen was measured as the pressure drop in psi from a 2.4 L vessel. The results at three different hydrogen levels are shown in Table I.

TABLE I

| Run No. | Catalyst, g | Productivity, (g/g) | H$_2$, psi | Melt Index |
|---|---|---|---|---|
| 1 | .0168 | 17,600 | 40 | 126 |
| 2 | .0119 | 23,100 | 15 | 0.13 |
| 3 | .0143 | 28,500 | 10 | 0.04 |

The polymer resulting from Run 2 had a heterogeneity index as determined by Mw/Mn of 13.4, flexural modulus of 1545 Mpa, environmental stress crack resistance of 131 hours, a rheological distribution index of 1.66, and a density of 0.9599 g/cc. These properties are consistent with those of many polyethylenes having significant commercial applications. (The term "catalyst" as used in the regard to productivity refers to the solid catalyst component only and does not include the cocatalyst and activator).

EXAMPLE III

A series of catalysts were prepared using VCl$_4$, ethylaluminum dichloride, and various phosphorus compounds in the same manner as generally employed in Example II. The resulting solid catalysts were evaluated for ethylene polymerization as in Example II, the only exception being that in some runs, viz. Runs 4–14, the hydrogen was 60 psi measured from the pressure drop of a 0.325 L vessel and in Runs 15–20, it was 20 psi as measured from a 2.4 L vessel. The results of the polymerizations are set forth in Table II.

TABLE II

| | Additional Catalysts from VCl$_4$ and EADC | | | |
|---|---|---|---|---|
| Run No. | Phosphorus Compound | Productivity (g/g) | MI | HLMI/MI | Density (g/cc) |
| 4 | triethylphosphite | 54,700 | 1.9 | 47 | 0.9616 |
| 5 | tributylphosphate | 18,200 | 0.36 | 60 | |
| 6 | triethylphosphate | 44,100 | 0.16 | 87 | |
| 7 | triethylphosphate | 27,900 | 1.5 | 46 | |
| 8 | triethylphosphate | 41,000 | 0.68 | 61 | |
| 9 | trioctylphosphate | 6,460 | 0.49 | 55 | |
| 10 | trimethylphosphite | 43,600 | 1.2 | 31 | |
| 11 | hexamethylphosphoramide | 45,300 | 5.0 | 37 | |
| 12 | diethylphosphite | 18,500 | 0.14 | 86 | |
| 13 | tri(2-chloroethyl)-phosphite | 27,900 | 1.7 | 36 | |
| 14 | trimethylphosphate | 16,300 | 1.6 | 74 | |
| 15 | tri-2-ethyl hexyl-phosphate | 13,070 | 1.1 | 61 | |
| 16 | triethylphosphite | 70,200 | 1.4 | 49 | 0.9628 |
| 17 | triethylphosphite | 49,400 | 4.2 | 49 | 0.9659 |
| 18 | triisopropylphosphite | 22,700 | 8.0 | 66 | |
| 19 | triphenylphosphine | 33,700 | 8.5 | 74 | |
| 20 | triphenylphosphine oxide | 23,800 | 4.6 | 47 | |

Most of the phosphorus compounds produced precipitates in substantially the same way as observed in the prep of Example II, namely the formation of a solution when the VCl$_4$ and the phosphorus compound were combined in CH$_2$Cl$_2$ and then the formation of a particulate solid when the EADC was added. With trioctylphosphate all the vanadium was not precipitated. However, as shown by Run 9, the recovered particulate solid was a moderately active catalyst. The combination of trimethylphosphite with VCl$_4$ in a 1/1 molar ratio gave a sticky solid in CH$_2$Cl$_2$. Doubling the molar amount of trimethylphosphite resulted in a solution which required an EADC/VCl$_4$ molar ratio of 2/1 in order to obtain a precipitate. The resulting precipitate was employed in Run 10 and is clearly a highly active catalyst.

EXAMPLE IV

Vanadium oxytrichloride, 6.30 mmoles, was added to 20 mL of $CH_2Cl_2$. Then 1.70 mL (6.30 mmoles) of tri-n-butylphosphate was added to give a solution black to reflected light and dark red to transmitted light. Addition of 6.30 mmoles of ethylaluminum dichloride caused a gradual color change to orange-black, to dark green, and then to dark blue as a solid was formed. The yield of blue solid was 1.70 g. This calculates to a theoretical maximum vanadium content of 18.8 weight percent.

Another catalyst was prepared in the same manner using $VOCl_3$ and triethylphosphite rather than the tri-n-butylphosphate. A violet solid in a yield of 1.82 g was obtained. The calculated vanadium content of the solid was 17.7 weight percent.

Polymerizations were carried out with these two catalysts at 100° C. in 2 L of isobutane with an ethylene pressure of 230 psi and hydrogen measured from a 2.4 L vessel. A mixture of 0.5 mmole of triethylaluminum and 3 mL of $CH_2Cl_2$ was used as cocatalyst. The results are summarized in Table III.

TABLE III

| | Catalysts from $VOCl_3$ | | | | |
|---|---|---|---|---|---|
| Run No. | Phosphorus Compound | Productivity (g/g) | $H_2$ | MI | HLMI/MI | Density (g/cc) |
| 21 | tri-n-butylphosphate | 23,000[b] | 20 | 0.72 | 62 | 0.9675 |
| 22 | triethylphosphite | 49,400[c] | 20 | 0.49 | 69 | 0.9633 |

[b]Mw/Mn = 12.2, flexural modulus 1673 Mpa, RDI = 1.59, ESCR 49 hrs.
[c]Mw/Mn = 11.7, flexural modulus 1698 Mpa, RDI = 1.62, ESCR 80 hrs.

EXAMPLE V

In order to evaluate the effect of the levels of the three reactants upon the resulting catalysts a series of catalysts were prepared using different amounts of vanadium, phosphorus, and aluminum compounds.

A first catalyst was prepared without the use of any phosphorus compound. $VCl_4$ and EADC were reacted at a 1/1 molar ratio in $CH_2Cl_2$ to obtain 1.82 g of solid from 6.30 moles of $VCl_4$ implying 17.6 weight percent V in the solid.

In another prep 12.6 mmoles of triethylphosphite were combined with 6.3 mmoles of $VCl_4$ in $CH_2Cl_2$. It was noted that 12.6 mmoles of EADC was needed to completely precipitate the vanadium. The reaction produced 1.38 g of catalyst with a calculated weight percent vanadium of 23.1.

In yet another prep the P/V ratio and the Al/V ratio was raised to 3. Precipitation was not complete. However, 0.07 g of particulate catalyst was recovered.

Moving in the other direction, the amounts of triethylphosphite and EADC were kept at 6.3 mmoles while the $VCl_4$ was raised to 10.4 mmoles, and in another prep to 20.8 mmoles. This results in P/V ratios of 0.6 and 0.3. The former yielded 2.43 g of particulate solid with a calculated weight percent vanadium of 21.8 and the later 4.27 g of particulate solid with a calculated 24.8 weight percent V.

The effect of these catalysts in polymerizing ethylene is summarized in Table IV.

TABLE IV

| | Varying the P/V Ratio | | | | | |
|---|---|---|---|---|---|---|
| Run No. | P/V | Productivity (g/g) | MI[a] | HLMI/MI | Mw/Mn | RDI |
| 23 | 0 | 3,750 | 0.22 | 111 | | |
| 24 | 0.30 | 28,000 | 0.08 | 122 | | |
| 25 | 0.30 | 34,900[b] | 0.05 | 136 | 16.0 | 1.79 |
| 26 | 0.60 | 30,500 | 0.22 | 57 | | |
| 16 | 1.0 | 70,200 | 1.4 | 49 | 9.4 | 1.56 |
| 27 | 2.0 | 28,200 | 1.4 | 30 | 7.0 | 1.48 |
| 28 | 3.0 | 49,300 | 0.95 | 30 | 6.4 | 1.42 |

[a]All polymerizations were carried out at 100° C. in 2 L of isobutane with ethylene pressure of 230 psi and 60 psi of hydrogen measured as the pressure drop from a 0.325 L vessel. As usual 0.5 mmole of triethylaluminum and 3 mL of $CH_2Cl_2$ were charged to the reactor.
[b]The amount of triethylaluminum was increased to 1.5 mmole.

The catalyst prepared with the phosphite is clearly not as active as the inventive catalysts. Variation in the ratio of phosphorus to vanadium gives some control over the molecular weight distribution. Values of the HLMI/MI ratio, heterogeneity index (Mw/Mn) and (RDI) rheological distribution index all decline as the P/V ratio increases. This indicates a narrowing of the molecular weight distribution as the P/V ratio increases. Also as the P/V ratio increases the amount of aluminum required to give complete precipitation of the vanadium increases.

EXAMPLE VI

The catalyst employed in Run 4, i.e., one produced from $VCl_4$, EADC, and triethylphosphite, was employed in a series of polymerizations in which ethylene was copolymerized with 1-butene. For comparison purposes a couple of copolymerizations were also conducted using a high activity titanium catalyst. The results are summarized in Table V.

TABLE V

| | | Copolymerizations | | | | |
|---|---|---|---|---|---|---|
| Run No. | Productivity (g/g) | $C_2H_4$ (psi) | $H_2^a$ (psi) | $H_2^b$ (psi) | MI | Density |
| 29 | 69,400[c] | 230 | 25 | | 0.18 | 0.9254 |
| 30 | 112,000[c] | 230 | 25 | | 0.13 | 0.9253 |
| 31 | 28,800 | 230 | 25 | | V. High | 0.9223 |
| 32 | 40,400 | 230 | | 60 | 9.8 | 0.9291 |
| 33 | 22,000 | 150 | | 20 | 55 | 0.9162 |
| 34 | 10,500 | 100 | | 20 | 630 | 0.9014 |

[a]All polymerizations were run at 80° C. in 2 L of isobutane with 200 g of butene-1 and 0.5 mmole of triethylaluminum and 3 mL of $CH_2Cl_2$. These runs contained hydrogen measured as the pressure drop from a 2.4 L vessel.
[b]Hydrogen measured as the pressure drop from a 0.325 L vessel.
[c]These results were obtained with a titanium catalyst.

EXAMPLE VII

As noted in Example I, it was not found possible to obtain a particulate solid from the reaction of $VCl_4$, EADC, and tri-n-butylphosphate in a liquid consisting essentially of hydrocarbon. A series of tests were made to determine what other liquids would allow the recovery of a particulate solid.

The liquids tested were $CH_2Br_2$, 1-chlorobutane, and tetrachloroethylene. The liquids were first washed with concentrated $H_2SO_4$ and then aqueous potassium bicarbonate and water. Subsequently the liquids were dried over magnesium sulfate and then over Davison H-151 alumina.

Addition of 1.22 mL of triethylphosphate (7.18 mmoles) to 7.18 mmoles of $VCl_4$ in 25 mL of 1-chlorobutane gave a dark red solution. As 4.8 mL of EADC solution (7.2 mmoles) was added, a burgundy colored solid formed. Some of the solid adhered to the reactor walls but 1.86 g of particulate solid was recovered. A productivity of 20,500 g/g was noted for this catalyst.

Similar results were obtained when the solution above was heated to 60° C. before the addition of the EADC. Productivity for the catalyst was 30,300 g/g.

When the same amounts of the same reactants were used in tetrachloroethylene, a considerable amount of oily red liquid separated in the first step. However, addition of the EADC and stirring for 1 hour still permitted the isolation of 7.57 g of particulate solid. The activity of the catalyst was, however, very low, e.g. 1780. The low activity is attributed to agglomeration of the catalyst.

In contrast to the results obtained using triethylphosphate, the alternative liquids were not as suitable when the phosphorus compound was triethylphosphite. Addition of 7.18 mmoles, 1.23 mL of triethylphosphite to 7.18 mmoles of $VCl_4$ in 20 mL of 1-chlorobutane immediately gave an oily solid. Even heating to 60° C. did not dissolve the solid. Similar results were obtained using tetrachloroethylene in the place of the 1-chlorobutane. When $CH_2Br_2$ was used there was still gummy solid formation but it was not as severe and after EADC addition 1.90 g of a rose colored powder was isolated.

EXAMPLE VIII

All the polymerizations tabulated thus far have used triethylaluminum and $CH_2Cl_2$ as the cocatalyst system. Numerous other cocatalyst systems have been tested. A summary of the results obtained using other cocatalysts and the same catalyst as used in Run 4 is shown in Table VI.

TABLE VI

Various Cocatalyst Systems

| Run No. | Cocatalyst | mmoles | Activator | mmoles | Productivity (g/g) | MI | HLMI/MI | Condition[a] |
|---|---|---|---|---|---|---|---|---|
| 35 | DEAC | 0.5 | $CH_2Cl_2$ | 47 | 6,830 | 1.9 | 57 | A |
| 36 | TMA | 0.5 | $CH_2Cl_2$ | 47 | 19,000 | 8.0 | 45 | A |
| 37 | TIBA | 0.5 | $CH_2Cl_2$ | 47 | 40,700 | 13.2 | 44 | A |
| 38 | TIHA | 0.7 | $CH_2Cl_2$ | 47 | 5,370 | 1.8 | 66 | A |
| 39 | TEA | 0.5 | $CH_2Cl_2$ | 47 | 37,300 | 25 | | A |
| 40 | TEA | 0.5 | $CFCl_3$ | 33 | 16,600 | 8.2 | 94 | A |
| 41 | TEA | 0.5 | $CF_2Cl\ CFCl_2$ | 25 | 40,400 | 23 | | A |
| 42 | TEA | 0.5 | None | | 10,200 | 0.28 | 56 | B |
| 43 | TEA | 0.5 | $CH_3CCl_2CH_3$ | 29 | 0 | | | B |
| 44 | TEA | 0.5 | $CH_3CCl_3$ | 30 | 4,030 | 0.59 | 38 | B |
| 45 | TEA | 0.5 | $CH_2BrCl$ | 33 | 14,500 | 33 | | B |
| 46 | TEA | 0.5 | $CH_2ClCH_2Cl$ | 38 | 13,000 | 1.6 | 41 | B |
| 47 | TEA | 0.5 | $CF_2ClCCl_3$ | 47 | 1,700 | 0.8 | 223 | B |
| 48 | TEA | 0.5 | $CFCl_2CFCl_2$ | 47 | 12,000 | 0.65 | 36 | B |
| 49 | TEA | 0.5 | $CF_2ClCF_2Cl$ | 47 | 37,900 | 0.09 | 50 | B |
| 50 | TEA | 0.5 | $CF_2Cl_2$ | 64 | 36,900 | 0.82 | 46 | B |
| 51 | TEA | 0.5 | $CH_2Br_2$ | 47 | 31,100 | 2.3 | 53 | B |
| 52 | TEA | 0.5 | $CH_2Cl_2$ | 1.6 | 34,400 | 0.59 | 49 | B |
| 53 | TEA | 0.5 | $CH_2Cl_2$ | 7.8 | 43,800 | 0.36 | 53 | B |
| 54 | TEA | 0.5 | $CH_2Cl_2$ | 47 | 47,800 | 0.35 | 41 | B |
| 55 | TEA | 0.5 | $CH_2Cl_2$ | 78 | 38,800 | 0.33 | 51 | B |
| 56 | TEA | 1.7 | $CH_2Cl_2$ | 1.6 | 16,000 | 0.73 | 44 | B |
| 57 | TEA | 1.7 | $CH_2Cl_2$ | 7.8 | 39,800 | 0.43 | 49 | B |
| 58 | TEA | 1.7 | $CH_2Cl_2$ | 47 | 61,900 | 0.05 | 96 | B |
| 59 | TEA | 1.7 | $CH_2Cl_2$ | 78 | 46,400 | 0.59 | 54 | B |
| 60 | TEA | 3.3 | $CH_2Cl_2$ | 7.8 | 26,500 | 0.51 | 43 | B |
| 61 | TEA | 3.3 | $CH_2Cl_2$ | 47 | 39,300 | 0.28 | 54 | B |
| 62 | TEA | 3.3 | $CH_2Cl_2$ | 78 | 65,500 | 0.08 | 52 | B |
| 63 | TEA | 3.3 | $CH_3CH_2CH_2CH_2Cl$ | 29 | 17,300 | 0.94 | 84 | B |

[a]All polymerizations were carried out at 100° C. in 2 L of isobutane with an ethylene pressure of 230 psi and the following:
Condition A - 20 psi of hydrogen measured from a 2.4 L vessel.
Condition B - 60 psi of hydrogen measured from a 0.325 L vessel.

Runs 35–39 show that there is little difference in behavior, except in terms of productivity. The best results were obtained with triethylaluminum and with triisobutylaluminum. In regard to the halocarbon activators, Run 43 reveals that 2,2-dichloropropane was not suitable. This is attributed to the reactivity of the secondary chlorides. Likewise Runs 40, 44, and 47 demonstrate that compounds having three chlorines on one carbon do not appear to be particularly good activators.

Runs 52–62 demonstrate that the activator to cocatalyst ratio can be varied over a wide range with little change in catalyst productivity. Especially good results were obtained with a $CH_2Cl_2$/TEA molar ratio near 20.

EXAMPLE IX

Addition of 20 mL of the 25 weight percent EADC heptane solution (30 mmoles) to 5.15 mL of triethylphosphite (30 mmoles) in 10 mL of heptane gave two phases which were colorless. When a 1 mL portion of the lower phase was added to 6.30 mmoles of $VCl_4$ in 20 mL of $CH_2Cl_2$, a violet powder was isolated that was an active catalyst. When an attempt was made to form the catalyst with a heptane solution of $VCl_4$ only a sticky oil was obtained.

EXAMPLE X

In another prep $VCl_4$ was added to 20 mL of $CH_2Cl_2$, then 5.0 mL of the EADC heptane solution was added and then 1.26 mL of triethylphosphite was added. The process yielded 2.27 g of a purple solid. The activity of the solid in ethylene polymerization was tested using 0.0102 g of the solid, 1 mmole of triethylaluminum, and 2 mmole of $CFCl_2 CFCl_2$. The catalyst was active. The productivity was 9,100 g/g/hr. When the same reactants were combined in the most preferred reaction order of phosphite to $VCl_4$ followed by EADC, a solid was obtained which with the same cocatalyst system gave a productivity of 43,500 g/g/hr.

EXAMPLE XI

Another series of catalysts were prepared using aluminum compounds other than those mentioned in the preceding examples.

In one prep ethylaluminum sesquichloride (EASC) was added to an equimolar mixture of 6.3 mmoles of $VCl_4$ and tri-n-butylphosphite in $CH_2Cl_2$. A total of 3.15 mmoles of EASC was needed to give a precipitate.

In another run, the EASC was replaced by diethylaluminum ethoxide (DEAEO). Even at an Al/V ratio of 1 no solid was formed. After 24 hours, a thick gel was obtained from which 1.84 g of brown particulate solid was isolated.

In contrast to the difficulty of obtaining particulate solid using tri-n-butylphosphate and DEAEO, when DEAEO was used as a precipitating agent for a $CH_2Cl_2$ mixture of $VCl_4$ and triethylphosphite, a precipitate was obtained at an Al/V ratio of only 0.5. While some of the solid was sticky, 1.12 g of particulate solid was isolated and used as catalyst.

The DEAEO was also an effective precipitating agent for a $CH_2Cl_2$ solution of $VCl_4$ and triphenylphosphite. An Al/V ratio of 0.5 permitted most of the product to be isolated as a powder. When EADC was used on the $CH_2Cl_2$ solution of $VCl_4$ and triphenylphosphite, in contrast a sticky material was obtained from which no powder could be isolated.

The above described particulate catalysts were evaluated in the polymerization of ethylene using the same conditions as employed in Example II. The results are summarized in Table VII.

TABLE VII

| | | $VCl_4$ Catalysts | | | | |
|---|---|---|---|---|---|---|
| Run No. | Al Compound | Phosphorus Compound | Productivity (g/g) | $H_2$ | MI | HLMI/MI | Density (g/cc) |
| 64 | EASC | tri-n-butylphosphate | 6,860 | 20 | 7.3 | 79 | |
| 65 | DEAEO | tri-n-butylphosphate | 33,700 | 20 | 1.1 | 54 | 0.9619 |
| 66 | DEAEO | triethylphosphite | 40,800 | 20 | 7.5 | 51 | 0.9678 |
| 67 | DEAEO | triphenylphosphite | 11,250 | 20 | 27 | | |

This demonstrates that catalysts can be prepared using aluminum compounds other than ethylaluminum dichloride.

EXAMPLE XII

Another series of ethylene polymerizations were conducted using a catalyst prepared from $VCl_4$, triethylphosphite, and EADC and a cocatalyst comprising triethylaluminum (TEA) and 1,2-difluorotetrachloroethane as activator. The results are summarized in Table VIII.

TABLE VIII

| | $CFCl_2CFCl_2$ Activator | | |
|---|---|---|---|
| Run No. | Activator Mmoles | Cocatalyst Mmoles | Productivity g/g |
| 68 | 0.5 | 0.5 | 22,300 |
| 69 | 0.5 | 1.0 | 20,100 |
| 70 | 0.5 | 2.0 | 26,300 |
| 71 | 1.0 | 0.5 | 30,800 |
| 72 | 1.0 | 1.0 | 37,300 |
| 73 | 1.0 | 2.0 | 18,100 |
| 74 | 2.0 | 0.5 | 31,500 |
| 75 | 2.0 | 1.0 | 33,400 |
| 76 | 2.0 | 2.0 | 31,500 |
| 77 | 4.0 | 0.5 | 30,400 |
| 48 | 47 | 0.5 | 12,000 |

These results indicate that the best results in terms of activity are obtained when one uses at least 1 mmole of the activator and the molar ratio of activator to TEA is in the range of about 1/1 to about 8/1. A comparison of the results of Runs 68-77 with that of Run 48 indicates that the results will generally not be as desirable if one used very high molar ratios of 1,2-difluorotetrachloroethane to TEA. This is somewhat in contrast to the results obtained using dichloromethane as an activator. See Runs 52-62 of Table VI wherein it is shown that high productivities are obtained even at activator to cocatalyst molar ratios as high as 160/1. The best in Runs 52-62 are those using at least about 8 mmoles of activator and an activator/TEA molar ratio in the range of about 16/1 to about 28/1.

What is claimed is:

1. A process for preparing a solid particulate catalyst component comprising (A) reacting reactants comprising
   (1) a vanadium compound having a V—X linkage where X is halogen,
   (2) an organoaluminum compound selected from those having the formula $AlR'_nX_{3-n}$ wherein X is halogen, each R' is individually selected from the group consisting of alkyl radicals, aryl radicals, cycloalkyl radicals, and alkoxy radicals, and n is a number from 1 to 3, and
   (3) an organophosphorus compound having a P—L linkage wherein L is selected from the group consisting of alkyl radicals, alkoxy radicals, aryl radicals, aryloxy radicals, cycloalkyl radicals, cycloalkyloxy radicals, cycloalkylaryl radicals, alkylamino radicals, and haloalkyloxy radicals, or
   (B) reacting reactants comprising said organoaluminum compounds as defined for (2) and a composition having functionality of the formula

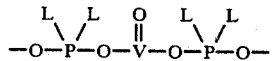

wherein each L is individually selected from the group consisting of the L's as defined for (3), under suitable conditions in a liquid which allows the product of the reaction to form as a particulate solid, said liquid consisting essentially of nonaromatic halocarbon.

2. A process according to claim 1 wherein said catalyst is prepared by reacting said organoaluminum compound and a compound of the formula

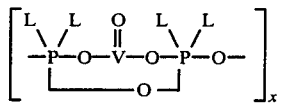

wherein x is an integer between 2 and 6.

3. A process according to claim 1 wherein said liquid is selected from 1-chlorobutane, tetrachloroethylene, dibromomethane and dichloromethane.

4. A process according to claim 1 wherein said vanadium compound is reacted with said organophosphorus compound and the resulting product is then reacted with said organoaluminum compound.

5. A process according to claim 4 wherein said vanadium compound is selected from $VCl_4$ and $VDCl_3$.

6. A process according to claim 5 wherein said liquid consists essentially of dichloromethane.

7. A process according to claim 6 wherein said organophosphorus compound comprises at least one compound selected from the group consisting of triethylphosphite, tributylphosphite, triethylphosphate, trioctylphosphate, trimethylphosphite, hexamethylphosphoramide, diethylphosphite, tri(2-chloro-ethyl)-phosphite, trimethylphosphate, tri(2-ethyl hexyl)phosphate, triisopropylphosphite, triphenylphosphine, and triphenylphosphine oxide.

8. A process according to claim 7 wherein the P/V ratio of the reactants is in the range of about 0.2/1 to about 4/1 and the Al/P ratio of the reactants is in the range of about 0.5/1 to about 2/1.

9. A process according to claim 8 wherein said organoaluminum compound comprises at least one compound selected from the group consisting of ethylaluminum dichloride, diethylaluminum chloride, trimethylaluminum, triisobutylaluminum, ethylaluminum sesquichloride, diethylaluminum ethoxide.

10. A process according to claim 8 wherein said organoaluminum compound consists essentially of ethylaluminum dichloride.

11. A process according to claim 10 wherein said vanadium compound consists essentially of $VCl_4$.

12. A process according to claim 11 wherein said organophosphorus compound consists essentially of tri-n-butylphosphate.

13. A process according to claim 11 wherein said organophosphorus compound consists essentially of triethylphosphite.

14. A process according to claim 13 wherein the P/V atom ratio of the reactants is in the range of about 0.2/1 to about 4/1 and the Al/P atom ratio of the reactants is in the range of about 0.5/1 to about 2/1.

15. A process according to claim 12 wherein the P/V atom ratio of the reactants is in the range of about 0.2/1 to about 4/1 and the Al/P atom ratio of the reactants is in the range of about 0.5/1 to about 2/1.

16. A process according to claim 9 wherein the P/V atom ratio of the reactants is in the range of about 0.2/1 to about 4/1 and the Al/P atom ratio of the reactants is in the range of about 0.5/1 to about 2/1.

17. A vanadium-containing catalyst produced by the process of claim 14.

18. A vanadium-containing catalyst produced by the process of claim 15.

19. A vanadium-containing catalyst produced by the process of claim 16.

20. A vanadium-containing catalyst produced by the process of claim 1.

* * * * *